May 9, 1961    A. BAERFUSS    2,983,652
FERMENTER
Filed Feb. 19, 1959
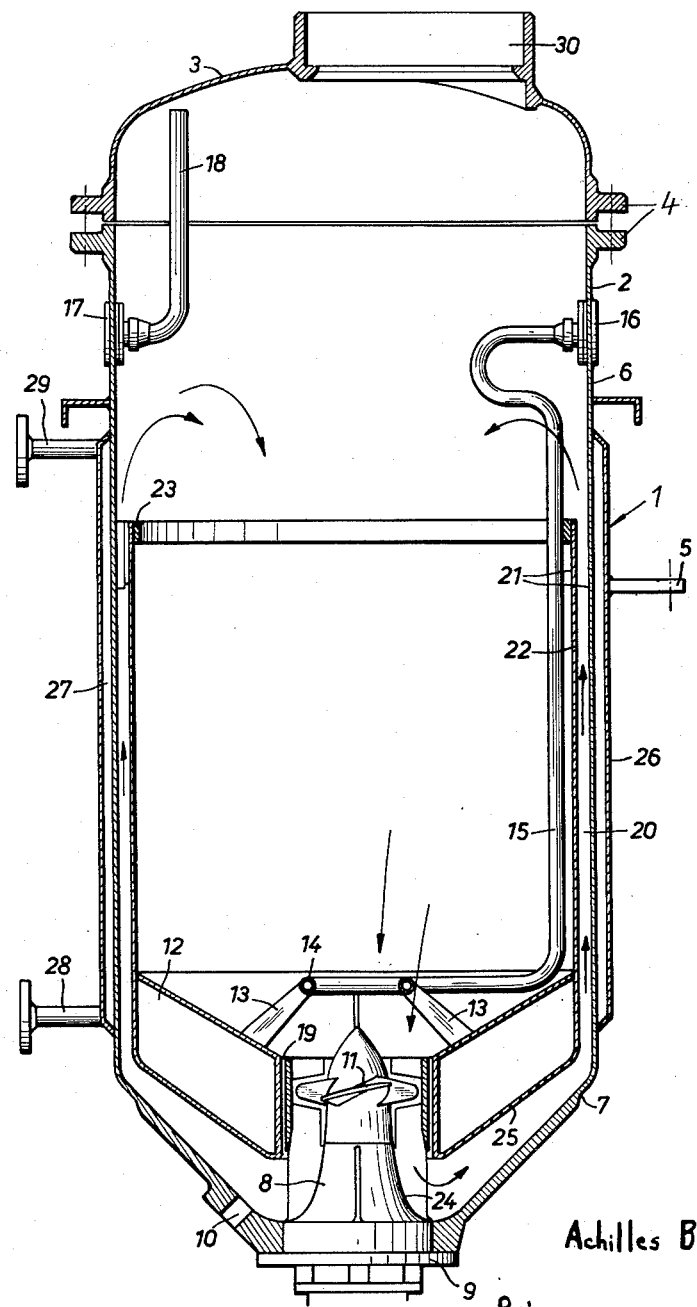
Achilles BAERFUSS
INVENTOR
By:
Wenderoth, Lind & Ponack
Attys United States Patent Office 2,983,652
Patented May 9, 1961

2,983,652
FERMENTER
Achilles Baerfuss, Oberwil, near Basel, Switzerland, assignor to Hch. Bertrams Aktiengesellschaft, Basel, Switzerland
Filed Feb. 19, 1959, Ser. No. 794,439
Claims priority, application Switzerland Feb. 21, 1958
2 Claims. (Cl. 195—143)

This invention relates to fermenters and more particularly to fermenters of the type used for cultivating microorganisms, especially of the aerobe types.

Fermenting devices of the described type are known, comprising an upright vessel, the lower central section of which being provided with a distributor, which is connected to an air supply conduit and below which a motor driven movement means for the liquid content of the vessel is located. Said liquid consists of a nutritive solution, in which a pure culture of the microorganisms to be cultivated is enriched in the concentration by continuous circulation in the vessel while oxygen is supplied by means of the inflowing air. Agitators were hitherto mainly employed as movement means for mixing the liquid and for thoroughly mixing the latter with the incoming air. Though said agitators due to the stirring process also cause a certain circulation of the liquid in the vessel, this circulation is very different on various points of the vessel, so that it is more or less left to chance how far and to which extent intermixing of the liquid and thorough mixing with the admitted air takes place on the average.

The present invention is based on the knowledge that the microbiological process and thus the increase in concentration of the microorganisms to be cultivated takes place in the nutritive preparation so much more rapidly and more effectively, the greater the homogeneity of the nutrient medium is, including the oxygen distribution by the admitted air.

It is an object of the invention to satisfy the requirement described above to an optimum degree.

According to the invention, the fermenter of the type described, having an upright vessel, a distributor arranged in the lower central portion of said vessel and connected to an air supply conduit, and a motor driven movement device provided for the liquid content of the vessel and located below said distributor, comprises a neck-shaped contraction provided on said vessel below the air distributor, and a liquid moving device located within said contraction and formed as bladed wheel having a vertical shaft drivable from the outside, the terminal portion of the vessel situated underneath said contraction being formed, as deflecting means for the outflowing liquid, into a hollow cylinder consisting of a double walled jacket member open at its bottom and at its top, and extending upwardly until a predetermined level. A continuous circulation of the vessel content involving the entire liquid content of the vessel can thus be obtained, as the liquid moved by the bladed wheel is first separated from the remaining vessel content, then discharged from the bottom end, and finally admitted again from the top end. By means of a suitable formation of the deflection means for the liquid discharged from the bladed wheel, moreover, the rate of flow and the pressure distribution of the separated portion of the liquid, together with the entrained air portion, can be influenced with respect to an intensive dispersion of air in the liquid. In addition, the transition of the oxygen into the liquid can be improved by the mode of readmitting the detached portion of the vessel content to the remaining portion, since it is easily possible to hereby obtain a considerable surface enlargement of the area contacting the air. The readmission of the separated portion of the vessel content can namely advantageously take place under formation of an overfall arrangement for the returned liquid-air mixture, in which case the dispersion of the overflowing mass will be all the better, the greater the height of fall is. This proceeding takes place in the air situated above the liquid content of the vessel, so that this air together with the air entrained in the separated liquid has a comparatively large contact surface with the liquid, whereby optimum prerequisites for an efficient transition of oxygen into the liquid are again provided.

A complete mutual adjustment of the temperature of all parts of the content of the vessel naturally occurs during the whole circulating and intermixing process; especially a favorable temperature regulation can be effected by controlling the temperature of the separated liquid portion so that temperature adjustment is secured, when said portion has been subsequently returned to the remaining content of the vessel.

The present invention will now be described in more detail with reference to the accompanying drawing illustrating, by way of example, a preferred embodiment of the invention, and in which a vertical central sectional view of the fermenter is shown.

The fermenter comprises a vessel 1 which consists of a lower part 2 and an upper part 3 formed as a cover. On the sides facing each other said two parts are provided with flanges 4, adapted to be connected to each other in hermetically sealed manner, as usual, by means of threaded bolts.

The kettle is cylindrically shaped and mounted with its axis in vertical position by means of laterally projecting eyes 5 in a manner not shown. The lower portion 2 of the vessel includes a cylindrical casing 6, the bottom portion of which terminates in a downwardly tapering bottom 7. The latter is provided with a central opening, into which a support 8 is inserted, carrying at its bottom side a flange 9 which is connected with the bottom 7 in leak-tight relationship by means of screws in a manner not shown. Arranged in the bottom 7 is also a lateral opening 10, which is connected to a discharge conduit not shown. A bladed wheel 11 having a vertical axis is mounted for rotation on the support 8. Said bladed wheel is carried by a vertical shaft not shown, which is rotatably journalled in the support 8 and drivable by a motor not shown. Disposed above the vessel bottom 7 and spaced apart from the latter is an annular displacing body, formed as hollow body and carrying at its top side inclined braces 13, supporting an air distributor 14, which is centrally located a short distance above the bladed wheel 11 and suitably consists of an annularly bent tube, which is provided with outlet openings and connected with an air supply conduit 15. Said conduit is upwardly extended until the upper portion of the lower part 2 of the kettle and, at this level is passed through the wall of the kettle under formation of a connecting flange 16. A supply conduit for compressed air, not shown in the drawing, is connected to the flange 16. In analogous manner an air discharge conduit 16 is passed through the wall of the lower part 2 of the kettle at the opposite side under formation of a connecting flange 17. The conduit 18 reaches until the uppermost section of the highly domed cover 3, at which part the inlet opening of the pipe 18 is situated.

The displacing body 12 forms below the air distributor 14 a neckshaped contraction 19 of the vessel, wherein the bladed wheel 11 is accommodated. The terminal section of the vessel situated underneath said contraction is formed as a hollow cylinder 20 and acts as deflecting device for the liquid issuing from the bladed wheel 11. Said hollow cylinder is built as a double walled jacket member 21, which is extended until above the predetermined liquid level of the vessel. At its outside the hollow cylinder 20 is bounded by the casing 6 of the lower portion 2 of the vessel, while the inner circumferential casing 22 is mounted on the outer edge wall of the displacing body 12. The top end of the inner casing 22 forms an overfall edge 23 for the liquid issuing from the hollow cylinder 20 which is open at its bottom and top end.

The external surface 24 of the support 8 is downwardly enlarged, in order to provide a continuous lateral deflection of the liquid flowing out of the bladed wheel 11. The top face of the vessel bottom 7 conforms in its shape to the bottom face 25 of the displacing body 12 and continuously merges on the one hand into the external surface 24 of the support 8 and on the other hand into the conical casing 6. The space between the vessel bottom 7 and the bottom face 25 of the displacing body 12 gradually narrows from the inner towards the outer end. The conditions are provided so that the liquid issuing from the bladed wheel and entering the deflection zone marked by the directional arrow, is first subjected to a decrease in speed due to an enlargement of the sectional area and subsequently is receiving again an increase in speed and a corresponding pressure drop until the entrance to the hollow cylinder 20.

Arranged around the vessel casing 6 is a heat exchanger 26, which extends approximately across the zone of the hollow cylinder 20 and together with the vessel casing 6 forms an enclosed hollow space 27, to which is connected at each upper and lower end a pipe branch 28 and 29, respectively. A supply conduit and a discharge conduit, respectively, for a heat supply medium, which serves for tempering the liquid mainly flowing through the hollow cylinder, is connected to said pipe branches, whereby the liquid content of the vessel is regulated.

The nutritive solution to be treated and seeded with microorganisms to be enriched is filled in through an opening 30 provided in the cover 3 until it reaches a predetermined level. Then the opening 30 is closed by a closure means not shown which is traversed by a replenishing conduit, in order to replace the water possibly evaporating during operation. The charging of the entire solution may eventually also take place through the said replenishing conduit.

The heat exchanger is put in operation so that water continuously heated to a predetermined temperature enters the hollow space 27 through the branch 28, while cooled water flows out of the branch 29. The bladed wheel 11 is driven at a predetermined speed and compressed air is admitted through the air conduit 15 to a predetermined extent. The liquid contained in the central conical space is drawn through the air distributor 14 as well as alongside the latter, as indicated by arrows and partly entrains air discharged from the holes of the distributor 14, so that a mixture of liquid and air is forced through the space, located between the bottom 7 and the displacing body 12, and into the hollow cylinder 20, in which case the speed reduction of the traversing mixture, which takes place at the entrance point to the entire interspace, and the subsequent speed increase according to experience contributes to an increase in concentration of the dissolved oxygen in the liquid, which fact is of importance for the velocity of the microorganism concentration in the nutritive solution. Due to the turbulence produced by the bladed wheel 11 in the flow, a thorough intermixing of the mixture components takes place which also produces a like favourable effect.

The liquid-air mixture in flowing through the hollow cylinder 20 from the bottom to the top is brought to a predetermined temperature by the influence of a heat exchange 26, and then flows across the overflow edge 23 into the interior space of the vessel. Dependent on the adjusted suction and conveying action as produced by the bladed wheel 11, the liquid in leaving the hollow cylinder 20 is whirled more or less high and then drops by action of gravity, as indicated by arrows, down to the level of the liquid. Said level has a funnel shaped surface owing to the central suction produced by the bladed wheel 11, said funnel formation appearing so much more pronounced, the higher the produced output of the bladed wheel 11 is. The height of fall of the downcoming mixture of liquid and air is again increased by the greater depth of the funnel, whereby the dispersion of this mixture increases according to the height of fall. The contacting surface of the downfalling liquid thereby increases with respect to the air, completely filling the entire vessel space situated above the level of the liquid. Consequently an intimate airing of the liquid and a correspondingly enhanced oxygen reception by the nutritive solution takes place. The oxygen transition value is decisive for the efficiency of the total output of the fermenter and also represents an essential factor for the enrichment of the nutritive solution. Owing to the continuous circulation of the entire solution, the difference in concentration between the various places of the nutritive solution in the vessel is reduced to a minimum, so that the nutritive solution practically shows the same concentration at all places. Since the micro-biological process takes place in a comparatively diluted nutritive solution, owing to the described balance in concentration, the medium concentration is superior in comparison to that of known fermenters having a very different concentration at various points of the nutritive solution. The same is true with respect to the balanced temperature, which is promoted by the intensive circulation of the nutritive solution and also particularly by the thorough distribution during the overflow across the edge 23, which by the way is also the case with respect to the homogeneity of the nutritive solution concerning all other factors such as particularly the thorough intermixing and the excellent oxygen transition from air into liquid.

After the desired concentration has been obtained, the nutritive solution is drawn off to the desired extent through the conduit, now shown, which is connected to the bottom opening 10, and is replaced by filling in new nutritive solution through the supply conduit in the cover 3. In place of that, it is also possible to operate in continuous manner, by bringing about a continuous discharge of enriched solution through the bottom opening 10 after the desired concentration has been obtained and by admitting a similar amount of fresh nutritive solution through the supply conduit provided in the cover, whereby in comparison to the discontinuous process a correspondingly higher output can be obtained on account of the saving in time for the omission of the concentrates and the filling-in of the new charge, and in addition a more economical operation is also possible owing to working economics, as the continuous operation only requires a mere supervision.

I claim:

1. A fermenter for use in cultivating micro-organisms of the aerobe type, comprising an upright outer vessel, an upright inner vessel within said outer vessel and having the vertical walls thereof spaced from the walls of said outer vessel to define an annular vertical passageway between the two vessels having a radial dimension which is small relative to the diameter of said inner vessel, an annular body within said outer vessel at the bottom of said inner vessel and on which said inner vessel is mounted, said annular body having the upper face sloping downwardly toward the central opening thereof and having the lower face spaced from the bottom of said outer vessel and sloping upwardly and outwardly from adjacent the center thereof, said annular body further having a tubular central opening therethrough, the inner surface of the bottom of said outer vessel sloping upwardly and outwardly, the spacing between the central portions of the bottom of said inner and outer vessels being greater at the central portion of said fermenter than at the outer periphery thereof, whereby an upwardly and outwardly narrowing passageway is formed, an air distributor in said inner vessel positioned immediately above the central opening in said annular body and comprising a tube having a plurality of apertures therein, said tube being in an annular shape and having an air supply conduit attached thereto, a blade rotatably mounted in the tubular opening in said annular body for pumping liquid from said inner vessel through said central opening, motor means outside of said vessels connected to said blade, and curved deflecting means mounted on the bottom of said outer vessel beneath the central opening in said annular body for smoothly deflecting liquid coming through said central opening laterally along the bottom of said outer vessel and upwardly through said annular vertical passageway, the cross sectional area of the central opening in said annular body through which liquid is pumped by said blade being less than the cross sectional area of the widest portion of said upwardly and outwardly narrowing passageway, whereby the velocity of liquid passing from said inner vessel through said central opening and into said annular vertical passageway is first slowed and then speeded.

2. A fermenter as claimed in claim 1 in which said deflecting means comprises a support on which said blade is rotatably mounted, said support having a side wall which curves downwardly and outwardly from adjacent said blade to the bottom of said outer vessel.

References Cited in the file of this patent

UNITED STATES PATENTS

| | | |
|---|---|---|
| 899,756 | Nathan et al. | Sept. 29, 1908 |
| 2,111,726 | Plews | Mar. 22, 1938 |
| 2,522,947 | Hatch et al. | Sept. 19, 1950 |

FOREIGN PATENTS

| | | |
|---|---|---|
| 958,486 | France | Mar. 9, 1950 |